(12) United States Patent
Tohara et al.

(10) Patent No.: US 12,554,499 B2
(45) Date of Patent: Feb. 17, 2026

(54) DATA COMPRESSION USING INSTRUCTION SET ARCHITECTURE

(71) Applicant: Meta Platforms Technologies, LLC, Menlo Park, CA (US)

(72) Inventors: Tomonari Tohara, Sunnyvale, CA (US); Vignesh Vivekraja, Santa Clara, CA (US); Alagappan Valliappan, Kirkland, WA (US); Andrey Bushev, Kirkland, WA (US); Javid Jaffari, San Diego, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/525,083

(22) Filed: Nov. 30, 2023

(65) Prior Publication Data

US 2024/0220259 A1   Jul. 4, 2024

Related U.S. Application Data

(60) Provisional application No. 63/478,345, filed on Jan. 3, 2023.

(51) Int. Cl.
*G06F 9/30*   (2018.01)

(52) U.S. Cl.
CPC ...... *G06F 9/30178* (2013.01); *G06F 9/30038* (2023.08); *G06F 9/30134* (2013.01)

(58) Field of Classification Search
None
See application file for complete search history.

(56) References Cited

U.S. PATENT DOCUMENTS

| | | | |
|---|---|---|---|
| 9,665,303 B1* | 5/2017 | Huff | G06F 3/0664 |
| 11,176,018 B1* | 11/2021 | Aluri | G06F 11/348 |
| 11,216,186 B1* | 1/2022 | Armangau | G06F 3/0689 |
| 2012/0047126 A1* | 2/2012 | Branscome | G06F 16/24569 707/713 |
| 2019/0266217 A1* | 8/2019 | Arakawa | G06F 7/462 |
| 2021/0073171 A1* | 3/2021 | Master | G06F 7/487 |
| 2022/0309190 A1* | 9/2022 | Gopal | H04L 9/0643 |

* cited by examiner

*Primary Examiner* — Eric Coleman
(74) *Attorney, Agent, or Firm* — Morgan, Lewis & Bockius LLP

(57) ABSTRACT

In one embodiment, a computing system may set data to a first group of registers. The first group of registers may be configured to be accessed during a single operation cycle. The system may set a number of patterns to a second group of registers. Each pattern of the number of patterns may include an array of index for the data stored in the first group of registers. The system may select, for a first vector register associated with a vector engine, a first pattern from the patterns stored in the second group of registers. The system may load a first portion of the data from the first group of registers to the first vector register based on the first pattern selected for the first vector register from the patterns stored in the second group of registers.

19 Claims, 10 Drawing Sheets

400A

Type I   D 0 D D D 0 0 0 0 D 0 D D D 0 0 0 D 0 0 0 0 D 0 D 0 0 0

Type II  D D 0 0 0 D 0 D | D 0 D 0 0 D 0 0 | 0 0 0 0 0 D D | D D D 0 D 0 0 0

Type III 0 0 0 0 0 0 0 | D D 0 D 0 D D | D 0 D D D D D | 0 0 0 0 0 0 0

Type IV  0 0 0 0 0 0 0 0 D8 D9 0 D11 0 D13 D14 D15 D16 0 D17 D18 D19 D20 0 0 0 0 0 0 0 0 D31 0

*FIG. 4A*

DATA COMPRESSION USING INSTRUCTION SET ARCHITECTURE

PRIORITY

This application claims the benefit under 35 U.S.C. § 119(e) of U.S. Provisional Patent Application No. 63/478,345, filed 3 Jan. 2023, which is incorporated herein by reference.

TECHNICAL FIELD

This disclosure generally relates to computer technology, in particular to hardware-based data compression and decompression.

BACKGROUND

A computer can be programmed to carry out sequences of arithmetic operation or logical operations automatically. Modern computers can perform generic programs. These programs enable computers to perform a wide range of tasks using processors, memories, and register files.

A computer can have a processor that use DMA and/or ISA. DMA (direct memory access) is a convenient way to transfer large amount data between different modules a computer. ISA (instruction set architecture) is part of a computer that defines how the CPU is controlled by the software. The ISA acts as an interface between the hardware and the software, specifying what the processor can do and how to do these tasks.

SUMMARY OF PARTICULAR EMBODIMENTS

Particular embodiments of this disclosure relate to systems and methods of using an embedded compression module within DMA to perform the data compression or decompression on the fly when the data is passed by the DMA from a source memory to a destination memory. As such, the compression module (which can perform both compression and decompression) may be an embedded module within DMA, rather than being a separate module outside the DMA. The embedded compression module may be implemented by embedding a global state machine compression module to control the compression and decompression processes. When the uncompressed or compressed data is passed into DMA, the input data of the DMA may be routed to the embedded compression module which may compress or decompress the input data on the fly during the same process while the output data is transmitted by the DMA to a destination memory. The output data may be in the compressed form or decompressed form that is the opposite of the input data. The computing system may send a start instruction to the embedded compression module to start the compression or decompression process. The embedded compression module may then compress or decompress the input automatically as controlled by the global state machine. As such, the compression or uncompressing processes may not need software to be involved and may be significantly faster than the traditional compression module as a separate module outside DMA.

Particular embodiments of this disclosure relate to systems and methods of using an ISA (instruction set architecture) instruction set including a number of ISA instructions to perform data compression and decompression (e.g., SIMD vector compression/decompression). These ISA instructions may work in MEM-to-MEM (memory to memory) applications. As an example and not by way of limitation, the vector register may be 64 bytes wide and the data bit may be 8 bit. The bit masks and values may be stored at separate memory locations rather than being stored together. By using the ISA instructions in data compression and decompression, the software codes for handling such compression and decompression may eliminate a large number of iteration loops (which will be performed at ISA level by the ISA instruction set). As such, the data compression and decompression process can be significantly faster than the traditional method which handles the data compression and decompression by the software cycles.

For the compression process, the ISA may include a compression module which is configured by ISA instructions to compress input data. The ISA may receive, by a compression module of the instruction set architecture, uncompressed input data and a command (a parameter of the configuration instruction) to compress the input data. The compression module may remove the zero data elements in the uncompressed input data and count the number of the zero data elements that are removed. The ISA may use a counter register to count the number of non-zero data elements in the uncompressed input data. The compression module may generate the zero removed data and a bit mask which include a number of flag elements (e.g., 1 or 0). Each of the flag element may indicate a non-zero data element (e.g., by "1") or a zero data element (e.g., by "0") in the uncompressed input data. The bit mask may be generated based on the counting result of the zero data element or the non-zero data element. The counter register may increase its value (e.g., by 1) each time a non-zero data element is detected in the uncompressed input data. The zero removed data may be shorter than data compression pipeline bandwidth (e.g., 64-byte) and may be sent to a shift register. The shift register may pack the zero removed data of one or more input data package (e.g., one package with 64 bytes) into output data package (e.g., 64 byte) that fit the bandwidth of the output interface (e.g., 64 bytes). The shift registers may write the remaining zero removed data (beyond the 64-byte limit) back to the buffer to be packed in the next round of outputting the compressed data.

For the decompression process, the ISA may include a decompression module which is configured by ISA instructions to decompress input data. The decompression module may first receive input bit mark data and compressed input data, and a command (e.g., a parameter in the configuration instruction) to decompress the input data. The decompressed module may count the number of non-zero data flag element in the bit mask and insert zero at the byte position of the mask flag elements that indicate the position of the zero data elements in the decompressed data. The decompressed module may output the decomposed data in data chunks or packages according to the output bandwidth (e.g., 64 bytes). Because the decompressed data may be longer than the compressed input data by having zeros inserted, the decompression module may use two buffers to temporarily hold the decompressed data beyond the output bandwidth to be output in the next round. A counter register may be used to count the numbers of data elements in the output decompressed data. When the value in the counter register is greater than a first threshold (e.g., 63), the decompression module may use the first buffer to hold the extra data in the compressed data stream. When the value of the counter register is greater than a second threshold (e.g., 127), the decompression module may use both buffers to hold the extra data in the compressed data stream that are beyond the output bandwidth limit (e.g., 64 bytes).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4A illustrates example data types that can be processed by the data compression schemes described in this disclosure.

DESCRIPTION OF EXAMPLE EMBODIMENTS

Figure 1B:
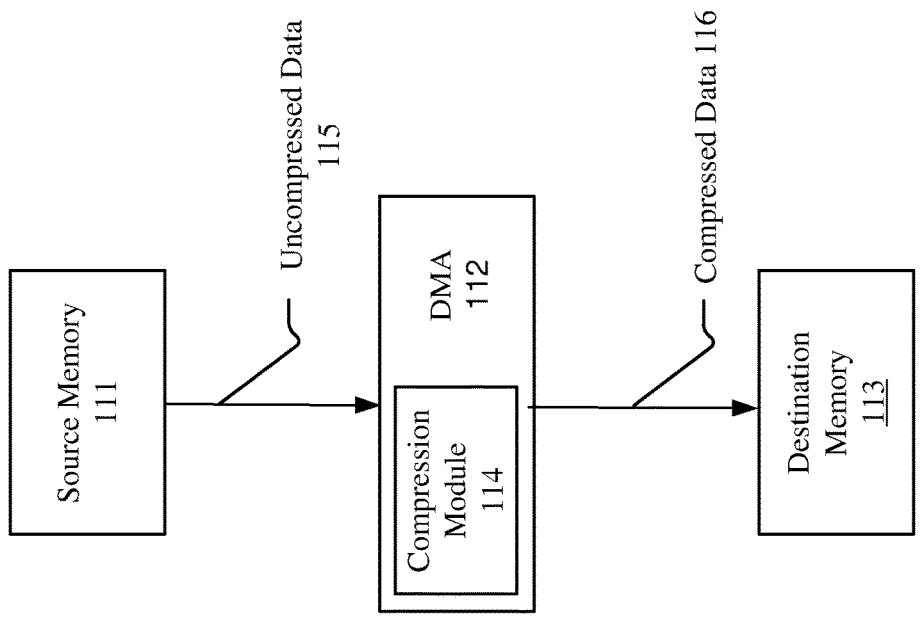
FIG. 1B illustrates an example implementation having an embedded compression module within the DMA.

Traditional computing systems have DMA (direct memory access) and data compression/decompression module implemented as separate hardware modules. The data needs to be compressed in a separate process before passing to other modules through DMA. For example, the traditional system needs to first load the uncompressed data to the compression module, where the data will be compressed. Then, the system needs to pass the compressed data to DMA which passes the compressed data to the destination memory. Such process has many disadvantages. First, the data compression module is a separate module with its own onboard memory and needs the data to be passed between other modules and the compression module back and forth, which will need many extra operation cycles. Second, as a separate module, the compression module needs to be configured and operated by software instructions that are specifically programmed for the compression module. Furthermore, traditional methods of using software instructions for data compression and decompression may need a large number of software iteration cycles (e.g., the software cycles) which could be slow and inefficient. As such, traditional computing systems could be difficult to program and need more computation resource (e.g., time, power) for data compression.

To solve these problems, particular embodiments of this disclosure relate to systems and methods of using an embedded compression module within DMA to perform the data compression or decompression on the fly when the data is passed by the DMA from a source memory to a destination memory. As such, the compression module (which can perform both compression and decompression) may be an embedded module within DMA, rather than being a separate muddle outside the DMA. The embedded compression module may be implemented by embedding a global state machine compression module to control the compression and decompression processes. When the uncompressed or compressed data is passed into DMA, the input data of the DMA may be routed to the embedded compression module which may compress or decompress the input data on the fly during the same process while the output data is transmitted by the DMA to a destination memory. The output data may be in the compressed form or decompressed form that is the opposite of the input data. The computing system may send a start instruction to the embedded compression module to start the compression or decompression process. The embedded compression module may then compress or decompress the input automatically as controlled by the global state machine. As such, the compression or uncompressing processes may not need software to be involved and may be significantly faster than the traditional compression module as a separate module outside DMA.

As another solution, the system may use an ISA (instruction set architecture) instruction set including a number of ISA instructions to perform data compression (e.g., SIMD vector compression) and decompression. These ISA instructions may work in MEM-to-MEM (memory to memory) applications. As an example and not by way of limitation, the vector register may be 64 Bytes wide and the data bit may be 8 bit. The bit masks and values may be stored at separate memory locations rather than being stored together. By using the ISA instructions in data compression and decompression, the software codes for handling such compression and decompression may eliminate a large number of iteration loops (which will be performed at ISA level by the ISA instruction set). As such, the data compression and decompression process can be significantly faster than the traditional method which handles the data compression and decompression by the software cycles.

For the compression process, the ISA may include a compression module which is configured by ISA instructions to compress input data. The ISA may receive, by a compression module of the instruction set architecture, uncompressed input data and a command (a parameter of the configuration instruction) to compress the input data. The compression module may remove the zero data elements in the uncompressed input data and count the number of the zero data elements that are removed. The ISA may use a counter register to count the number of non-zero data elements in the uncompressed input data. The compression module may generate the zero removed data and a bit mask which include a number of flag elements (e.g., 1 or 0). Each of the flag element may indicate a non-zero data element (e.g., by "1") or a zero data element (e.g., by "0") in the uncompressed input data. The bit mask may be generated based on the counting result of the zero data element or the non-zero data element. The counter register may increase its value (e.g., by 1) each time a non-zero data element is detected in the uncompressed input data. The zero removed data may be shorter than data compression pipeline bandwidth (e.g., 64-byte) and may be sent to a shift register. The shift register may pack the zero removed data of one or more input data package (e.g., one package with 64 bytes) into output data package (e.g., 64 byte) that fit the bandwidth of the output interface (e.g., 64 bytes). The shift registers may write the remaining zero removed data (beyond the 64-byte limit) back to the buffer to be packed in the next round of outputting the compressed data.

For the decompression process, the ISA may include a decompression module which is configured by ISA instructions to decompress input data. The decompression module may first receive input bit mark data and compressed input data, and a command (e.g., a parameter in the configuration instruction) to decompress the input data. The decompressed module may count the number of non-zero data flag element in the bit mask and insert zero at the byte position of the mask flag elements that indicate the position of the zero data elements in the decompressed data. The decompressed module may output the decomposed data in data chunks or packages according to the output bandwidth (e.g., 64 bytes). Because the decompressed data may be longer than the compressed input data by having zeros inserted, the decompression module may use two buffers to temporarily hold the decompressed data beyond the output bandwidth to be output in the next round. A counter register may be used to count the numbers of data elements in the output decompressed data. When the value in the counter register is greater than a first threshold (e.g., 63), the decompression module may use the first buffer to hold the extra data in the compressed data stream. When the value of the counter register is greater than a second threshold (e.g., 127), the decompression module may use both buffers to hold the extra data in the compressed data stream that are beyond the output bandwidth limit (e.g., 64 bytes).

By having the compression module embedded within DMA, the computing system may eliminate the process to pass the data back and forth between different modules for the data compression/decompression purpose, saving many computational resources and bandwidth related to data transmission. By having the automatic data compression and decompression as controlled by the state machine, the computing system may eliminate or significantly reduce the software codes and instructions that are traditionally needed for the data compression and decompression. The computing system may only need to configure the input data and parameters (e.g., compression, decompression) and the actual compression/decompression process would be automatically performed by the embedded compression module, eliminating all software evolvement during such process. By using the ISA instructions rather than software cycles to handle data compression and decompression, the software can eliminate a large number of loops and the data compression and decompression processes can be significantly faster (>100 time faster) than the traditional data compression process handled using software cycles.

Figure 1A:
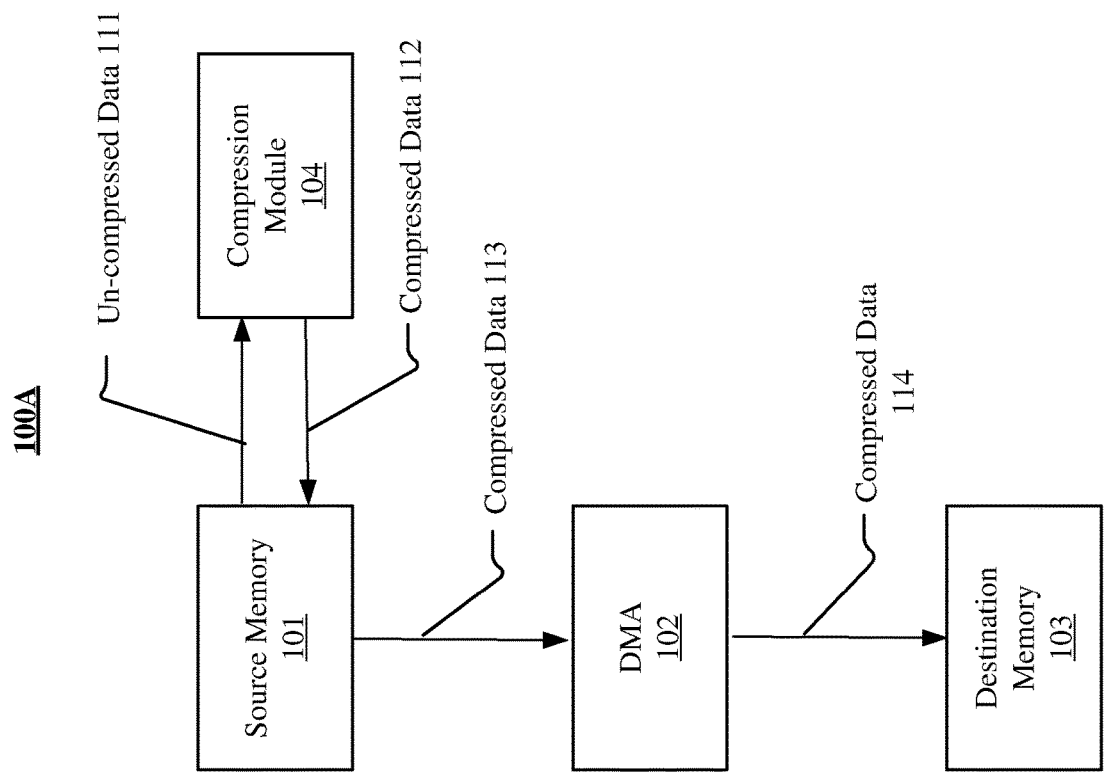
FIG. 1A illustrates a traditional implementation which has the compression module outside the DMA as a separate module.

FIG. 1A illustrates a traditional implementation 100A which has the compression module 104 outside the DMA 102 as a separate module. In this traditional implementation 100, the DMA 102 and data compression/decompression module 104 are implemented as separate hardware modules. To compress data and pass the data by DMA to the destination memory 103, the data may need to be compressed in a separate process by the compression module 104 before passing the DMA 102. The compression module 104 may have its own on-board memory separate from the source memory 101. The system may need to first load the uncompressed data 111 from the source memory 101 to the compression module 104, where the data will be compressed. Then, the system may need to pass the compressed data 112 back to the source memory 101, which pass the compressed data 113 to the DMA 102 which further passes the compressed data 114 to the destination memory 103. Such process may have many disadvantages. First, the data compression module 104 as a separate module may have its own onboard memory. The data needs to be passed between the source memory 101 and the compression module 104 back and forth, which will need many extra operation cycles and computation power. Second, as a separate module, the compression module 104 may need to be configured and operated by software instructions that are specifically programmed for the compression module 104. As such, such traditional computing systems could be difficult to program and need more computation resource (e.g., time, bandwidth, computation power) for data compression.

FIG. 1B illustrates an example implementation 100B having an embedded compression module 114 within the DMA 112. As an example and not by way of limitation, the DMA 112 may have an embedded compression module 114 within the DMA 112 to perform the data compression or decompression on the fly when the data is passed by the DMA from a source memory 111 to a destination memory 113. In other words, the compression module 114, which can perform both data compression and decompression, may be an embedded module within the DMA 112, rather than being a separate muddle outside the DMA. The DMA 112 may be configured to operate in a compression mode or decompression mode. Under the compression mode, when the uncompressed data 115 is passed into the DMA 112, the input data (uncompressed) may be routed to the embedded compression module 114 (which is configured to the compression mode) which may compress the input data on the fly during the same process while the compressed data 116 is transmitted by the DMA 112 to the destination memory 113 in the compressed form. Similarly, under the decompression mode, a compressed data (not shown) may be passed to the DMA 112 from the source memory 111. The input data (which is compressed) may be routed to the compression module 114 which is configured to operate in the decompression mode and decompress the compressed input data on the fly during the same process while the uncompressed output data (not shown) is transmitted by the DMA 112 to the destination memory 113.

The embedded compression module may have an embedded a global state machine to control the compression and decompression processes automatically and autonomously. The computing system may send commands, configuring parameters, and data to the DMA to start the compression or decompression process. The embedded compression module may then compress or decompress the input data automatically on-the-fly as controlled by the global state machine. As such, the compression or uncompressing processes may not need software to be involved and may be significantly faster than the traditional compression module as a separate module outside DMA.

Figure 2:
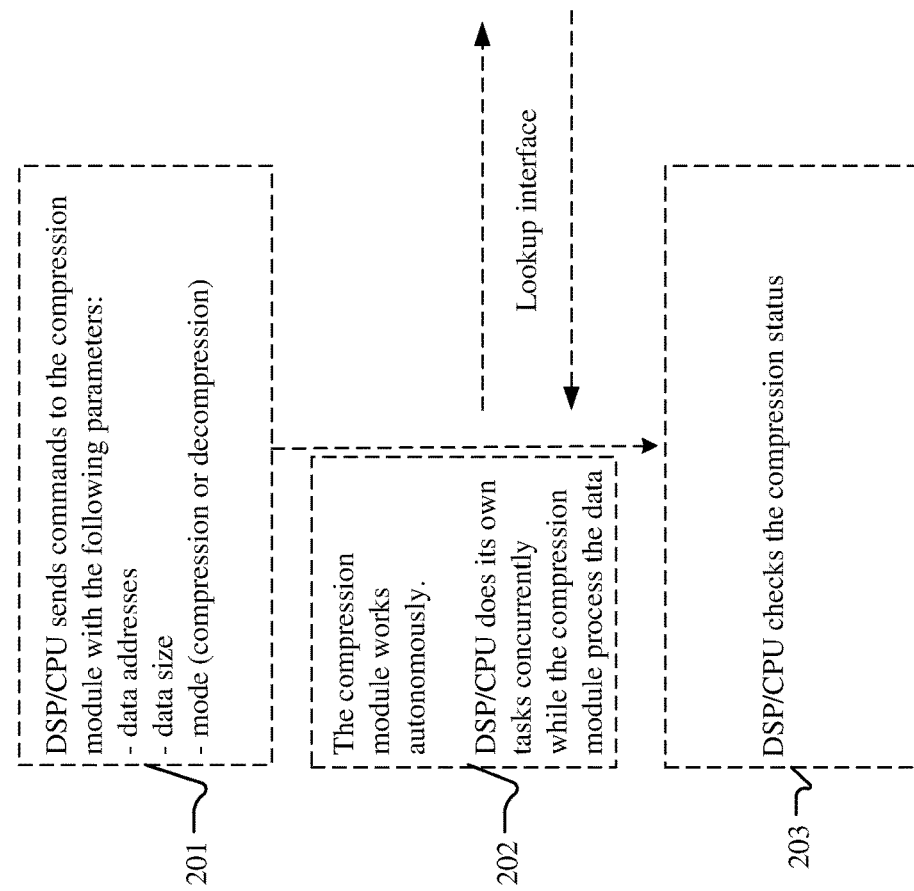
FIG. 2 illustrate an example control flow of using the compression module to perform data compression and decompression autonomously.

FIG. 2 illustrate an example control flow 200 of using the compression module 213 to perform data compression and decompression autonomously. As an example and not by way of limitation, at step 201, the DSP/CUP may send commands to the compression module 213, which can do either compression or decompression based on the input command parameters. The DSP/CPU may send to the compression module 213 one or more commands and a number of parameters including, for example, but not limited to, data addresses, data size, mode (compression or decompression), etc. At step 202, after receiving the commands and parameters from the DSP/CPU, the compression module 213 (which can be a tightly-coupled compression module) may perform the following steps autonomously as controlled by its embedded state machine until all data bytes are processed: (1) reading data from the memory bank 211 (which may include 4 memory units in this example), (2) performing the compression or decompression on the input data based on the mode parameter value and data parameter values, (3) writing the output data to the memory banks 211. The compression or decompression process may be performed autonomously without any intervention from the DSP/CPU or any involvement of software instructions during the compression or decompression process. In other words, the DSP/CUP may perform other tasks concurrently to the compression or decompression process performed by the compression module 213. However, at step 202 and/or 203, the DSP/CUP may check the compression or decompression status (e.g., whether it is completed or what is the progress) through lookup interface with the compression module 213 during and after the compression/decompression process. At end, after the data compression or decompression is completed, the DSP/CUP may use the output data stored in the memory banks 211 for the subsequent operations.

Figure 3:
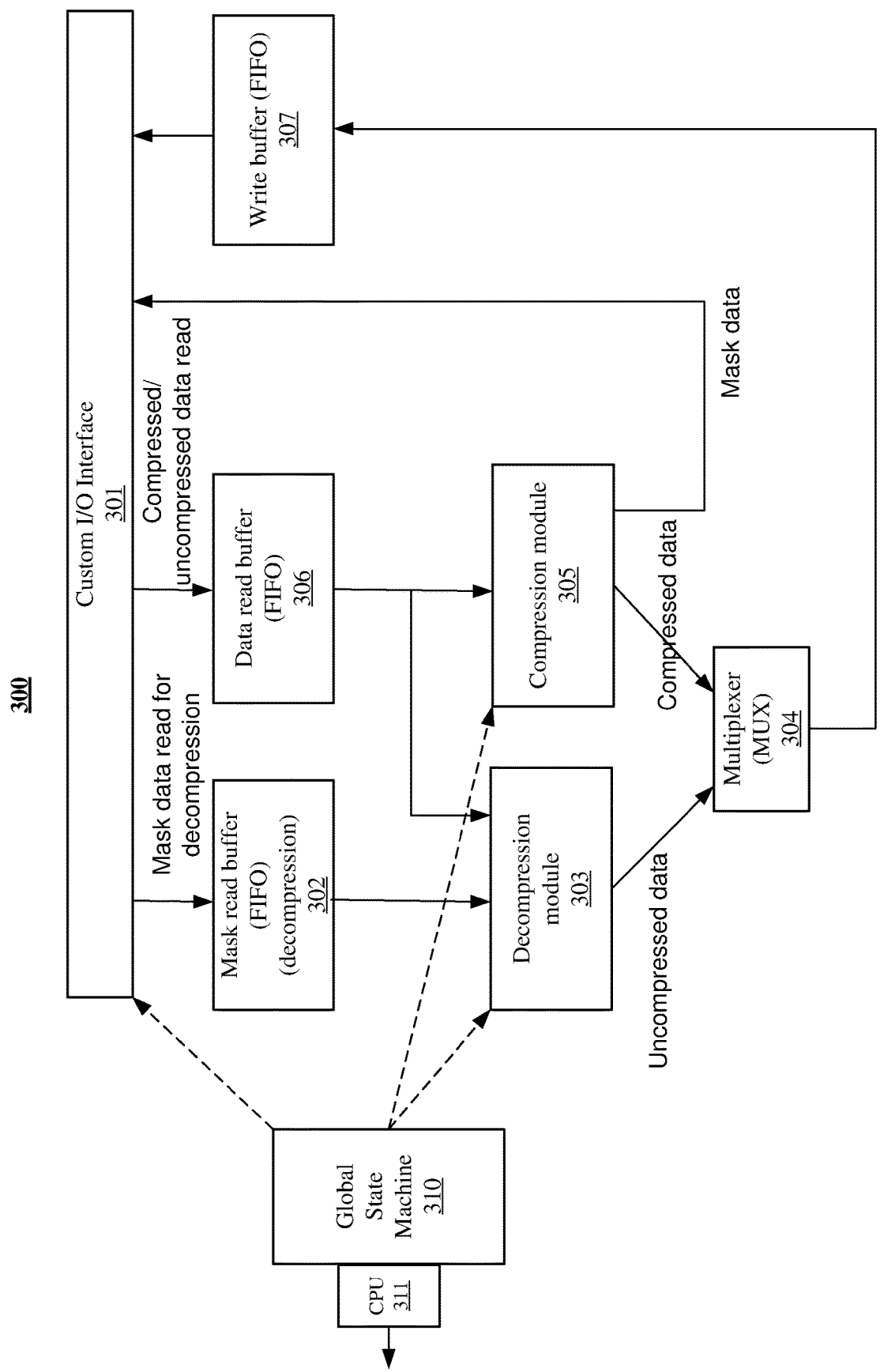
FIG. 3 illustrates an example hardware accelerator for the embedded compression module in the DMA.

FIG. 3 illustrates an example hardware accelerator 300 for the embedded compression module in the DMA. In particular embodiments, a hardware accelerator 300 may be used for the on-fly or inline data compression and decompression. The hardware accelerator 300 may be tightly coupled with the CPU with direct access to its tightly-coupled scratch-pad memory. Such an accelerator may be used to compress and decompress data directly from memory to memory. As an example and not by way of limitation, the hardware accelerator 300 may include a custom I/O interface 301, which may be configured to receive input data from and send output data to other modules like memory banks. In particular embodiments, the memory banks may include 4 data banks and the custom I/O interface 301 may use 3 parallel access cycles for reading from or writing data to the memory banks (e.g., 2 reading cycles and 1 writing cycle for a decompression operation, 1 reading cycle and 2 writing cycle for a compression operation). The hardware accelerator 300 may be configured to operate under a compression mode or a decompression mode. Each submodule of the hardware accelerator may have its local statement machine (e.g., a counter) to control its inside operations. The global state machine 310 may control coordinate and control the operations of the submodule of the hardware accelerator 300. Once activated, the global state machine 310 may control the hardware accelerator 300 to perform data compression autonomously without intervention or involvement from CPU/DSP software or instructions. The hardware accelerator may read data from data read buffer 306 (FIFO) if it is not empty and other conditions are met. Then, the hardware accelerator may perform compression, and output compressed data.

Under the compression mode, the received input data may be uncompressed data which may include data packets to be compressed. Under the decompression mode, the received input data may be compressed data, which may include mask packets and data packets in the compressed form. When the hardware accelerator 300 receives compressed data through the custom I/O interface 301, the compressed data packet may be routed to the data read buffer (FIFO) 306 and the mask packets of the compressed data may be routed to the mask read buffer 302. Then, the data read buffer 306 may pass the uncompressed data packets to the decompression module 303 while the mask read buffer 302 may pass the mask packets to the decompression module 303. Then, the decompression module 303 may decompress the compressed data packets based on the mask packets and send the uncompressed data to a multiplexer (MUX) 304. The uncompressed data may be sent to the write buffer (FIFO) 307 and sent to other modules through the custom I/O interface 301. The whole decompression process may be controlled by the global state machine 310 which is embedded within the hardware accelerator 300. In other words, the decompression process may be automatic as controlled by the global state machine 310 and may need not software instructions to get involved (except configuring the configuration and starting the decompression process).

Under the compression mode, the custom I/O interface 301 may receive uncompressed data, which may be routed to the data read buffer 306. Then, the data read buffer 306 may pass the uncompressed data to the compression module 305, which may compress the data and pass the compressed data packets to the multiplexer 304. Then, the compressed data packets may be sent to the write buffer 307 and the custom I/O interface 301 to be sent to other modules. The compressed data may include the compressed data packets and the mask data packets. The compression module 305 may send the mask data packets to the custom I/O interface 301 to be sent to other modules. The whole compression process may be controlled by the global state machine 310 which is embedded within the hardware accelerator 300. In other words, the compression process may be automatic as controlled by the global state machine 310 and may need not software instructions to get involved (except configuring the configurations and starting the compression process).

Dealing with sparse data may a common task in many machine-learning workloads, particularly in the field of weight coefficients and activations which exhibit levels and modes of sparsity. Sparsity could pose challenges to processors when it comes to data-movement. Sparse data can be compressed and moved in and out of processor's tightly coupled memory, to reduce the total data bandwidth overhead (e.g., the latency and power consumption). The challenge, however, is that traditional processors are not designed to efficiently handle sparse data movement and manipulation. In this disclosure, particular embodiment may use various types of zero (aka sparse) data compression/decompression schemes and multiple levels of acceleration at the ISA, tightly-coupled CPU accelerator, and DMA hardware levels.

FIG. 4A illustrates example data types 400A that can be processed by the data compression schemes described in this disclosure. As shown in FIG. 4A, the Type I data type may have a data stream that has complete random sparsity, where zero counts and positions are unpredictable and varied. The Type II data type may have a data stream with certain structural sparsity in varying shapes. The data set may have the total number of zero fixed and may be predictable within a predetermined length of the data stream, but random in placement (e.g., 4 randomly placed zeros in every 8 consecutive positions), as shown in FIG. 4A. The Type III data type may have a long stretch of fixed size zeros in the data (e.g., 8 zeros in batches), randomly positioned in the stream, as shown in the FIG. 4A. The Type IV data type may have long stretches of variable length zeros in the data, randomly positioned in the stream, as shown in FIG. 4A. It is notable that the numbers of zeros and lengths of stretches as shown in FIG. 4A are for example purpose only and the data types are not limited thereto. For example, the number of zeros and length of scratches may be any suitable numbers and any suitable lengths. The data elements (e.g., the "D" or "Dx") in the data stream may be any type of data type by itself including, for example, but not limited to, INT4, INT8, INT16, INT32, FP16, FP32, etc. The "INTx" may refer to an integer data type with x bits. The "FPx" may refer to a floating-point data type with x bits.

In particular embodiments, a number of decompression and compression schemes may be used for sparse data in a tightly-coupled CPU DMA. Such schemes may be used to compress or de-compresses data on the fly as the data is read into the CPU memory (TCM) from a system RAM. Such schemes may be used to compresses data on the fly as the output data is transferred back to the system RAM from TCM. Dense data (uncompressed tensor) may be compressed into a compressed form by eliminating the representation of zeros. The resulting sparse representation may have 2 components: flags and payload. The flags (spare encoding) may be a fixed size tensor with 1 bit flag representing zeros and non-zeros in uncompressed tensor T. The payload may be variable length tensor which holds the non-zero data. An example compressed data is shown below:

TABLE 1

Flag and payload components in an example compressed data format

| | Uncompressed | | | | | | | |
|---|---|---|---|---|---|---|---|---|
| | X | Y | Z | 0 | 1 | 0 | 2 | 3 |
| Flags | 8'b11101011 | | | | | | | |
| Payload | X | Y | Z | | 1 | | 2 | 3 |

The data types that are supported may include, for example, but not limited to, 4-bit, 8-bit, 16-bit, 32-bit data types, etc. In particular embodiments, the system may assume the data transfer to be 1D. In particular embodiments, the compressed data may be represented by independent (i.e., as separate tensors rather than being merged into on tensor) flags and payloads that can be separately transmitted and/or stored. An example representation of compressed data having independent or separate flags and payloads that can be separately transmitted and/or stored is as follow:

TABLE 2

Compressed data representation with separate flag tensor and payload tensor

| Flags | Flag 0 | Flag 1 | | | | | | |
|---|---|---|---|---|---|---|---|---|
| Payloads | Payload 0 | Payload 1 | Payload 2 | Payload 3 | Payload 10 | Payload 11 | Payload 12 | Payload 13 |

Alternatively, the compressed data may include flags and payloads that are concatenated or merged as a single tensor. The system may not be sensitive to either of these two representation forms. An example representation of compressed data having merged flags and payloads is as follow:

TABLE 3

Compressed data representation with merged flag and payload tensor

| Flag 0 | Payload 0 | Payload 1 | Payload 2 | Payload 3 | Flag 1 | Payload 10 | Payload 11 | Payload 12 | Payload 13 |
|---|---|---|---|---|---|---|---|---|---|

The block size of the flags/payload may be configurable (e.g., static or dynamic sizes) and may be aligned to 16-byte in particular embodiments. In particular embodiments, compression and decompression may be performed in a chunked granularity. The tensor may be compressed or decompressed in a monolithic fashion and the compression/decompression may not need to be performed from an intermediate region of the tensor.

Figure 4B:
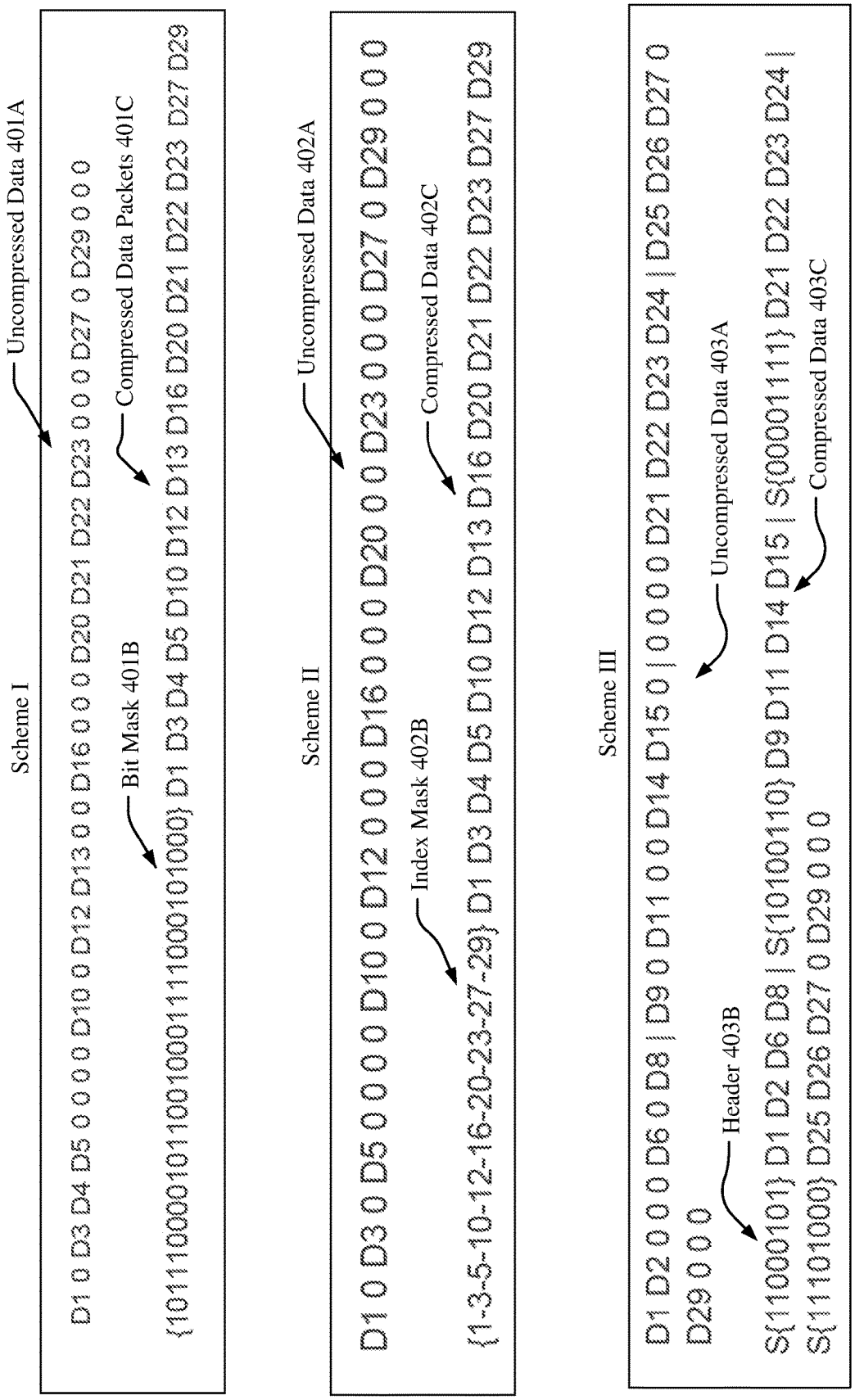
FIGS. 4B and 4C illustrate example schemes and that are used to compress and decompress data.
Figure 4C:
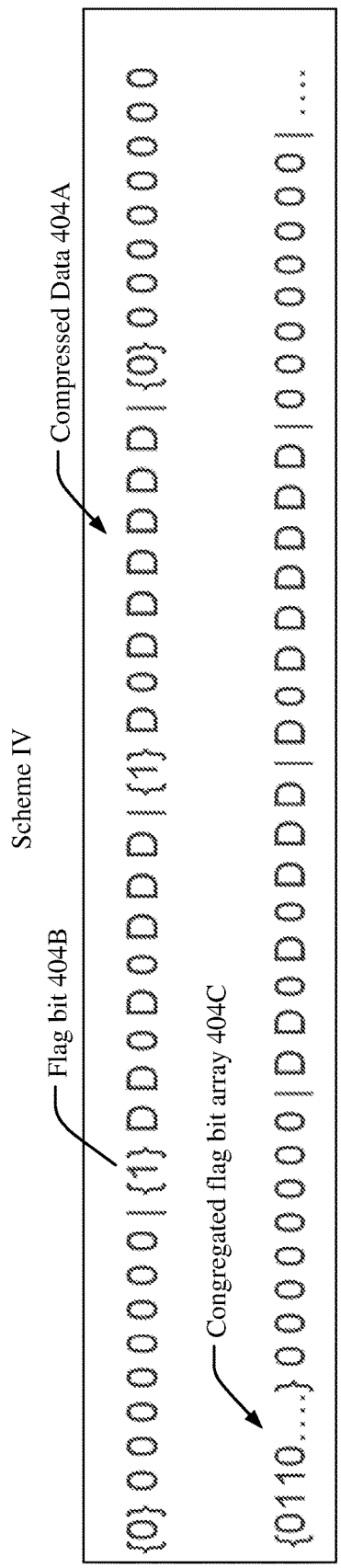
Figure 4C:
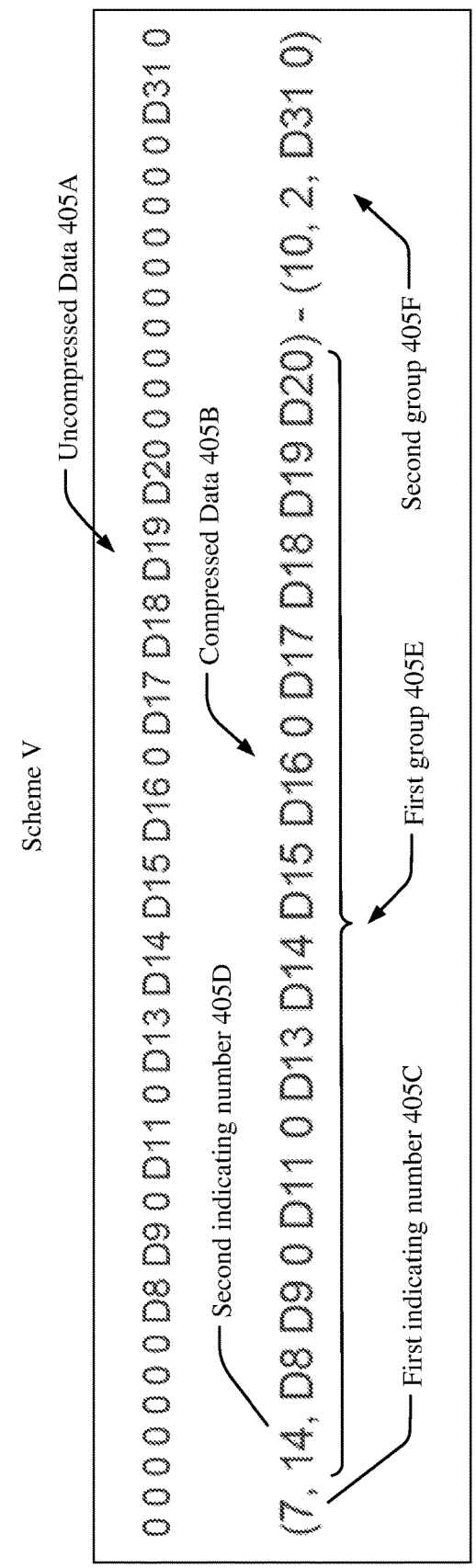

FIGS. 4B and 4C illustrate example schemes 400B and 400C that are used to compress and decompress data. In particular embodiments, the compression module may combine some or all of the schemes together, to build indexed, zero-masked, run-length, symbolled encoding for fixed or varying input lengths. As an example and not by way of limitation, as shown in FIG. 4B, the Scheme I may provide N-bit data mask (worst-case overhead of 1 bit per element) to mark data elements that are zero. The uncompressed data 401A may have a number of data elements at are zeros and a number of data elements that are not zeros. The non-zero elements and zero elements may be interleaved. The compressed data under the Scheme I may have a bit mask 401B which includes a bit data for each data elements (zero or non-zero) in the uncompressed data 401A. An "1" value may indicate that the corresponding data element is non-zero, and a "0" value may indicate that the corresponding data element is zero. The bits in the bit mask 401B may be congregated into a vector. In this example, the bit mask 401B may be a 32 bit mask positioned before the compressed data 401C. The bit mask 401B may be stored and transmitted separately from the compressed data 401C (e.g., D1 . . . D29) or may be stored and transmitted together with the compressed data 401C. The Scheme I may be applied to all data types as described in this disclosure but may provide an optimal result for the Type I data type.

As another example and not by way of limitation, as shown in FIG. 4B, the Scheme II may provide a separate index array reflecting the positions of the non-zero data elements. For the uncompressed data 402A, the compression result according to the Scheme II may include an index mask 402B and the compressed data 402C. The index mask 402B may include the index array with each indicating a non-zero data element position in the uncompressed data 402A. The non-zero data elements may be included in the compressed data 402C. The Scheme II may be applied to all data types as described in this disclosure. The Scheme II may provide an optimal result when the sparsity is very high and unpredictable.

As another example and by way of limitation, as shown in FIG. 4B, the Scheme III may encode a bit compressed symbol, as a header or every N words for M out of N sparsity (e.g., Type II data type). The header may reflect what pattern is to be decoded from the batch following the header. For the uncompressed data 403A, the compression result may include a number of headers (e.g., 403B) with each header including a series of bits, with "1" indicating a non-zero data element, and "0" indicating a zero data element in the uncompressed data 403A. the compressed data 403C may be congregated into batches with each data batch following an associated header. It is notable that since the symbols representing the patterns are only a subset of all the possibilities, and (m out n)<<2$^n$ (e.g., 4 out of 8=70<<2^8=256). The encoding of the patterns may need fewer number of bits than n, or exactly ceil($\log_2$(m out of n)). The Scheme III may be applied to all data types as described in this disclosure.

As another example and not by way of limitation, as shown in FIG. 4C, the Scheme IV may use a single bit as a flag that the subsequent fix length of data are all zeros or not. For example, the compressed data 404A may include a single bit (1, or 0) as a flag for each 8 bits that following the flag bit (e.g., 414A). Alternatively, the leading flag bits (e.g., 404B) may be congregated into a single array or vector and included in the front the data stream. The Scheme IV may be applied to all data types as described in this disclosure.

As another example and not by way of limitation, as shown in FIG. 4C, the Scheme V may have long stretch of zeros that can be compressed through a run-length coding. In Scheme V, the number of zeros and non-zeros may be encoded separately. For the uncompressed data 405A, the compressed data 405B may exclude the data segments that have more than two zeros adjacent to each other but include the single-zero elements in the data stream. The compressed data 405B may include a first indicating number 405C (e.g., 7) to indicate the length of an all-zero segment that was excluded. For example, the number 7 means that a data segment including 7 continuous zeros in the uncompressed data 405A was excluded from the compressed data 405B). The number 10 means that a data segment including 10 continuous zeros in the uncompressed data 405A was excluded from the compressed data 405B. The compressed data 405B may include a second indicating number 405D (e.g., 14) to indicate the length of a remaining segment that includes the non-zero data elements and the single-zero elements among the non-zero data elements. For example, the number 14 means that the length of the following data segment including non-zero data elements and the single-zero data elements is 14. The compressed data 405B may include a number of groups (405E and 405F). Each group may a first indicating number and a second indicating number, followed by a remaining data segment including the non-zero data elements and the single-zero data elements. The Scheme V may be applied to all data types as described in this disclosure.

In particular embodiments, DMA operations may need the following parameters for using the DMA APIs (application programing interfaces) including, for example, but not limited to source pointer, destination pointer, decompressed tensor size, compressed tensor size, tensor header, etc. For the compression operations, the decompression tensor size may be used to identify the chunk size of the uncompressed tensor U to be compressed. This parameter may be provided as a part of the DMA APIs. The compressed tensor size may be used as a part of DMA decompression. This parameter may be either returned by the DMA APIs or added as a header to the compressed tensor as the last transaction of AXI (advanced extensible Interface). Such operations may be based on a DMA API instead of a header to avoid unnecessary transactions to AXI and to keep the interface consistent. For decompression, either the decompression tensor size or the compressed tensor size may be used to identify the boundary of compressed data. The decompressed tensor size may be used to identify the size of the buffer allocated in TCM as part of the DMA API. The compressed tensor size may be extracted from the tensor header or value returned by the prior compression. In particular embodiments, a discrepancy between decompression and compressed data size may be provided as part of the DMA API and the values extracted by DMA operation may be reported as an error. For example, the decompression size provided in API may be X bytes while the decompressed tensor extracted by DMA is Y bytes.

In particular embodiments, the term "dense data" may refer to a representation of tensor in uncompressed form, where all elements exist and directly addressable. The term "payload" may refer to a representation of tensor in compressed form, where all elements equivalent to zero are eliminated. An index may have variable length as ID tensor of different data types (e.g., 8-bit unsigned integer type, 16-bit unsigned integer type, 32-bit unsigned integer type). The index may specify through 1-D offset either (1) starting from the beginning of the tensor where values of the are non-zeros; (2) offset from the previous non-zero element which is equivalent to number of zeros to skip). An example index-based compressed data is shown as follow:

TABLE 4

Index-based compressed data

| | Uncompressed Tensor | | | | | | | |
|---|---|---|---|---|---|---|---|---|
| | X | Y | Z | 0 | 1 | 0 | 2 | 3 |
| Index | N | 1 | 3 | 4 | | | | |
| Payload | X | Y | Z | 1 | 2 | | 3 | |

In particular embodiments, the system may assume the data transferring is 1D and may use the index as ascending sorted. The compressed data may be represented by independent index and payload tensors.

In particular embodiments, the system may use an ISA instruction set including a number of ISA instructions to perform data compression (e.g., SIMD vector compression) and decompression. These ISA instructions may work in MEM-to-MEM (memory to memory) applications. As an example and not by way of limitation, the vector register may be 64 Bytes wide and the data bit may be 8 bit. The bit masks and values may be stored at separate memory locations rather than being stored together. By using the ISA instructions in data compression and decompression, the software codes for handling such compression and decompression may eliminate a large number of iteration loops (which will be performed at ISA level by the ISA instruction set). As such, the data compression and decompression process can be significantly faster than the traditional method which handles the data compression and decompression by the software cycles.

Figure 5:
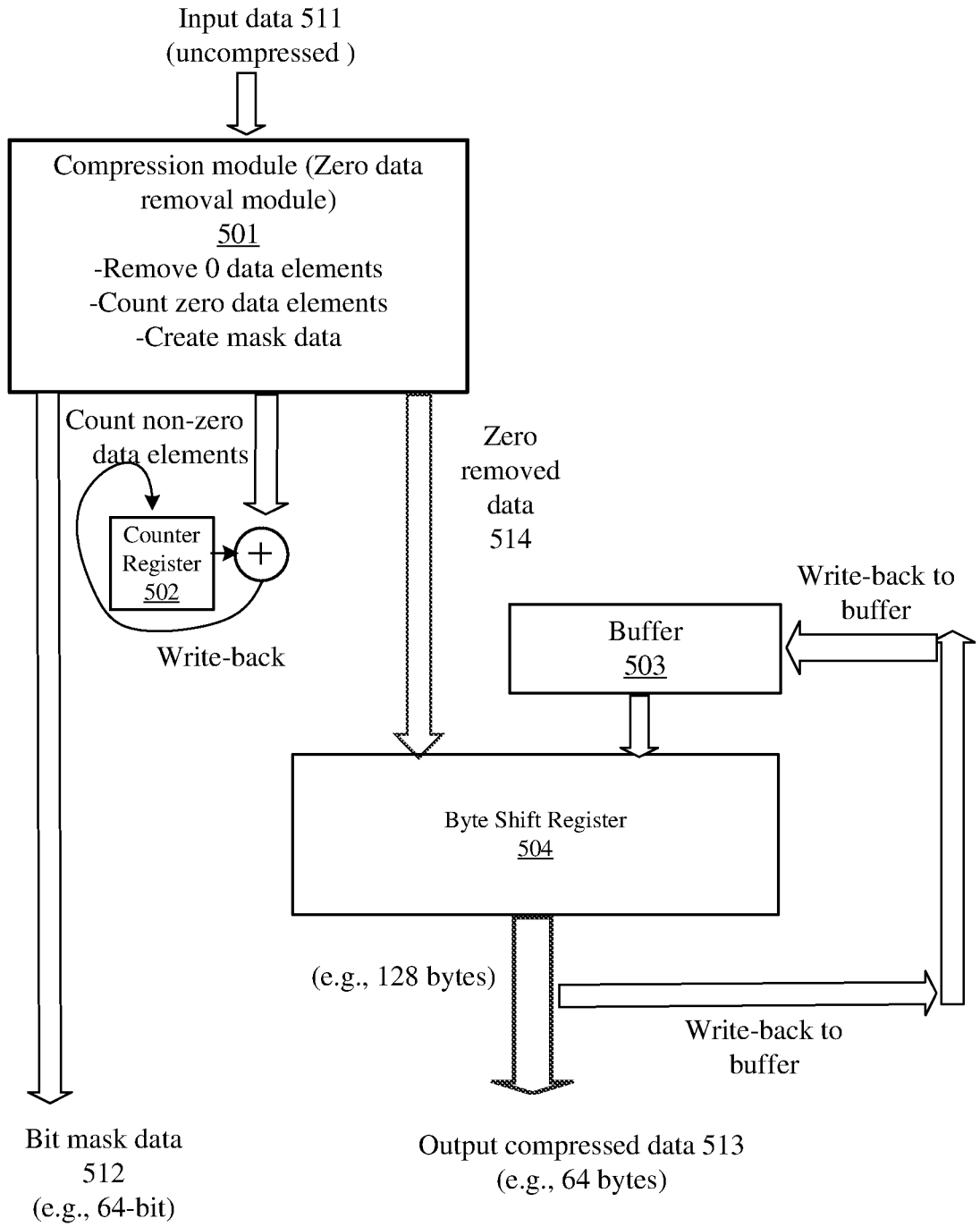
FIG. 5 illustrates an example compression process using ISA instructions.

FIG. 5 illustrates an example compression process 500 using ISA instructions. As an example and not by way of limitation, to support the data compression and decompression functionality, the ISA may include the zero data removal module 501, the counter register 502, the buffer 503, the byte shift register 504, etc. The input data 511 may be 64-byte uncompressed data (e.g., {120, 0, 5, 8, 0, 0, 45, 0 . . . 0} with 57 zeros). It is notable that the 64-byte data is only for example purpose and the data type is not limited thereto. For example, the input data type may be 32-byte data, 128-byte data, or any suitable data types. The zero data removal module 501 may check the uncompressed 64-byte input data 511 and may remove zero(s) from the uncompressed input data 511 and generate the bit mask data 512 (e.g., {101100100 . . . 0}) and the zero removed data 514 (e.g., {120, 5, 8, 45, nil . . . nil} nil: non-significant data) as the outputs. To create the bit mask data 512, if a data element in the uncompressed data is 0, the corresponding mask bit in the bit mask may be set to 0. Otherwise, the corresponding mask bit in the bit mask may be set to 1. The counter register 502 may hold a count value, counting the number of the non-zero data elements of the input uncompressed data 511 (e.g., 64-byte). The byte shift register 504 may concatenate previously compressed non-zero data elements and newly created compressed data. The output of the byte shift register 504 may be 128-byte data (e.g., {120, 5, 8, 45, 98, 0 . . . 0}), which half of the data (e.g., 64 bytes {98, 0 . . . 0}) being returned to the buffer 503 (e.g., a 64-byte buffer), and another half (64 types) being sent the subsequent memory to store as the output compressed data 513 of the data compression process. In parallel, the counter register 502 may increment by the count value from the first step of the zero data removal process. In this example, the counter register may be 7 bits for the 64-byte compression. The outputs may include the output compressed data 513 (e.g., 64 bytes), the bit mask data 512 may be 64 bits for the 64-byte data compression.

In particular embodiments, the input data 511 may be a continuous data stream that is fed to the zero data removal module 511. The continuous data stream may be processed in data chunks (e.g., 64-byte chunks) corresponding to the bandwidth of the data compression/decompression pipeline (e.g., the I/O interface and the zero data removal module 501). As an example and not by way of limitation, the bandwidth of the data compression/decompression pipeline may be 64 bytes. The zero data removal module 501 may take in 64-byte of uncompressed data in each step and may output a 64-bit mask data 512, and a 64-bypte compressed data 513. However, when an uncompressed data chunk (e.g., 64-byte) is compressed, the zero data elements may be removed, and the zero removed data 514 may usually be shorter than the input uncompressed 64-byte data chunk and shorter than the 64-byte output bandwidth. To further improve the efficiency of the data compression and decompression process, the byte shift register 504 may temporality store the zero removed data 514 which is shorter than the 64-byte output bandwidth, and wait for the next compressed data chunk. The zero data removal module 510 may continue the process to take in the next uncompressed data chunk (e.g., another 64-byte data chunk), generate the bit mask, and generate the zero removed data, which will be passed to the byte shift register 504. The byte shift register 504 may combine the previously stored zero removed data the current zero removed data to a 64-byte data chunk to be output as the output compressed data 513. The remaining compressed data elements beyond the 64-byte limit may be written back to the buffer 503 (which could be a 64-byte buffer). The ISA may repeat such process until all the uncompressed data stream has been processed. All the steps of the data compression process may be performed at a hardware level on a processor having the ISA as described in this disclosure.

It is notable that the data compression process performed by ISA using the corresponding ISA instruction set may be controlled by the count held by the counter register 502. As such, the data compression process, once started, may run automatically and autonomously until the uncompressed data stream is processed. The data compression process may not need any intervention or involvements from any software level instructions. Thus, a large number of software cycles related to data compression may be eliminated, and the data compression process may be significantly faster than the data compression by software cycles. To initiate a data compression process, the software may only need to configure the ISA by using the ISA instructions directly and feed the uncompressed data to the zero data removal module 501.

Figure 6:
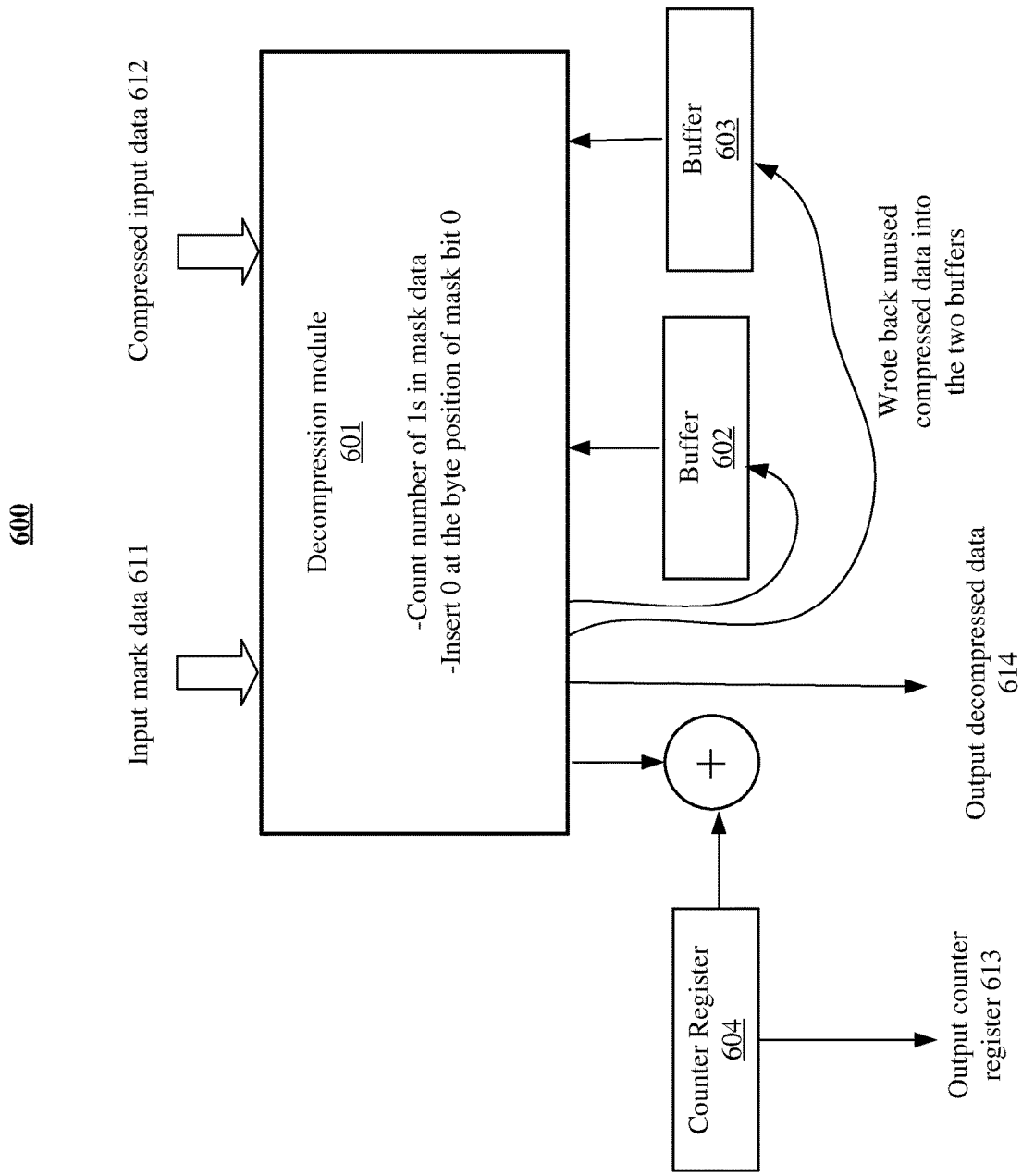
FIG. 6 illustrates an example decompression process using ISA instructions.

FIG. 6 illustrates an example decompression process 600 using ISA instructions. As an example and not by way of limitation, the decompression module 601 may have two inputs for the data decompression process: the input mask data 611 (e.g., 64-bit mask data: {0, 1, 1, 1, 0, 1, 0 . . . 0}) and the compressed input data 612 (e.g., 64-byte compressed data: {43, 12, 45, 9, . . . } no zero). It is notable that the 64-bit mask data and the 64-byte compressed data are for example purpose and the mask data and the compressed data are not limited thereto. For example, the compressed data may be 32 bytes, 64 bytes, 128 bytes, or any suitable byte length. The bit mask data may be 32 bits, 64 bits, 128 bits, or any suitable bit length. The decompression module 601 may first read the input mask data 611 (which could be 64-bit mask data in this example) and count the number of non-zero data elements ("1") in the bit mask data 611. In this example, the output decompressed data 614 may be 64-byte. The decompression module 601 may form 128-byte data with three 64-byte data sets. When the value in the counter register 604 is greater than a threshold (e.g., 63), the decompression module 601 may output the 64-byte decompressed data and use the buffer 602 to store the extra 64-byte data (if any). The decompressed data is even longer, the decompression module 601 may use the buffer 602 and buffer 603 to store the decompress data element beyond the 64-byte output bandwidth. The decompression module 601 may insert 0 data element at the position that the bit mask has a mask bit of 0. Then, the decompression module may output the 64-byte uncompressed data 614 (e.g., (0, 43, 12, 45, 0, 9, 0 . . . }). The unused data bytes of the compressed input data 612 may be written back to the buffer 602 and buffer 603. The counter register may increment by the count value during the decompression process. All the steps of the data decompression process may be performed at a hardware level on a processor having the ISA as described in this disclosure.

It is notable that the data decompression process performed by ISA using the corresponding ISA instruction set may be controlled by the count held by the counter register 604. As such, the data decompression process, once started, may run automatically and autonomously until all the compressed data stream is processed. The data decompression process may not need any intervention or involvements from any software level instructions. Thus, a large number of software cycles related to data decompression may be eliminated, and the data decompression process may be significantly faster than the data decompression by software cycles. To initiate a data decompression process, the software may only need to configure the ISA by using the ISA instructions directly and feed the bit mask data and compressed data to the decompressed module 611 for the decompression process. The compression and decompression processes may be performed by the ISA based on a number of ISA instructions.

Figure 7:
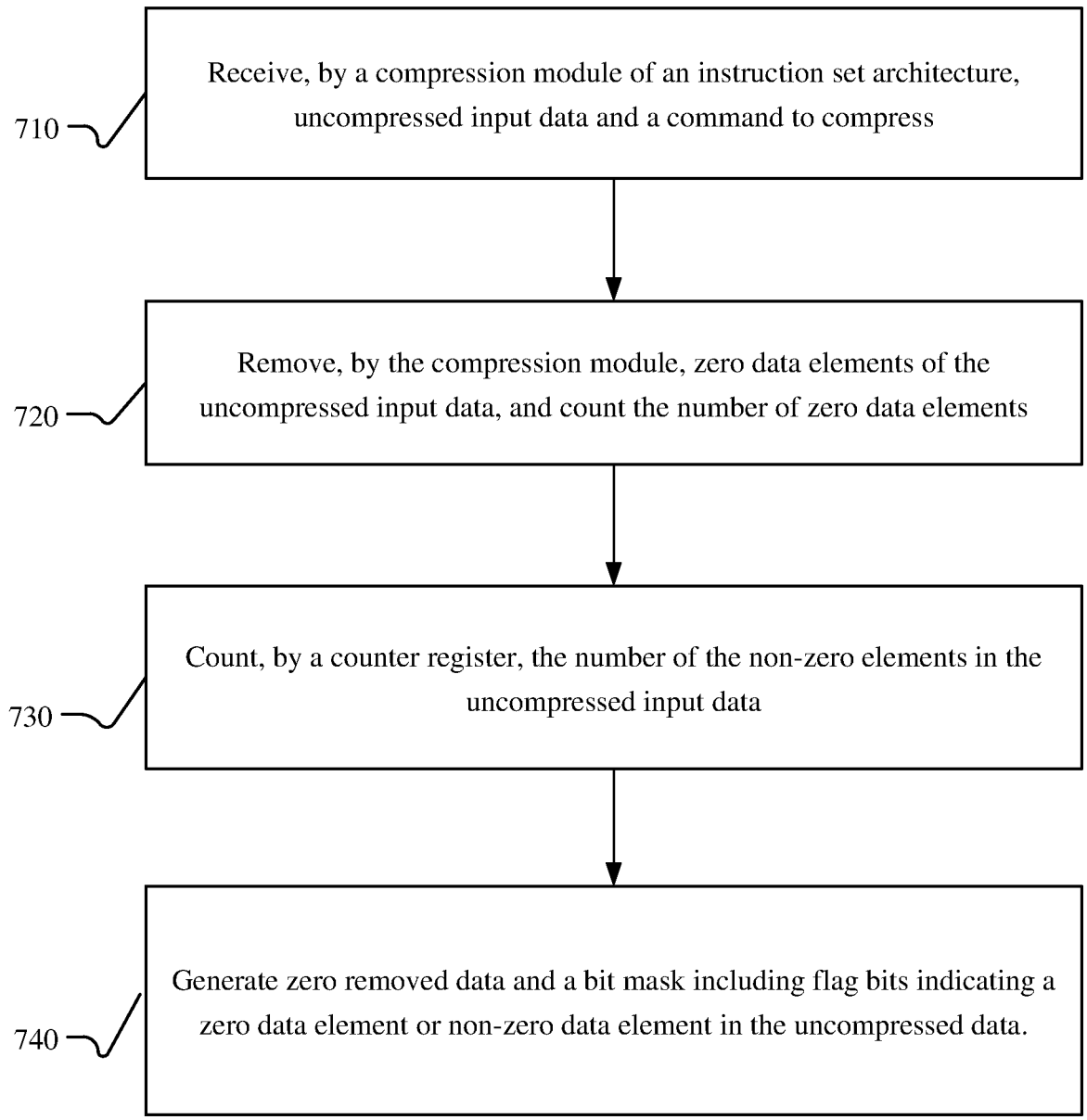
FIG. 7 illustrates an example method of using ISA instructions for data compression.

FIG. 7 illustrates an example method 700 of using an instruction set architecture to compress data. The method may begin at step 710, where an instruction set architecture (ISA) on a processor of a computing system may receive, by a compression module of the instruction set architecture, uncompressed input data and a command (a parameter of the configuration instruction) to compress the input data. At step 720, the compression module may remove the zero data elements in the uncompressed input data and count the number of the zero data elements that are removed. At step 730, the ISA may use a counter register to count the number of non-zero data elements in the uncompressed input data. At step 740, the compression module may generate the zero removed data and a bit mask which include a number of flag elements (e.g., 1 or 0). Each of the flag element may indicate a non-zero data element (e.g., by "1") or a zero data element (e.g., by "0") in the uncompressed input data. The bit mask may be generated based on the counting result of the zero data element or the non-zero data element. The counter register may increase its value (e.g., by 1) each time a non-zero data element is detected in the uncompressed input data. The zero removed data may be shorter than data compression pipeline bandwidth (e.g., 64-byte) and may be sent to a shift register. The shift register may pack the zero removed data of one or more input data package (e.g., one package with 64 bytes) into output data package (e.g., 64 byte) that fit the bandwidth of the output interface (e.g., 64 bytes). The shift registers may write the remaining zero removed data (beyond the 64-byte limit) back to the buffer to be packed in the next round of outputting the compressed data.

In particular embodiments, the ISA may include a decompression module which is configured by ISA instructions to decompress input data. The decompression module may first receive input bit mark data and compressed input data, and a command (e.g., a parameter in the configuration instruction) to decompress the input data. The decompressed module may count the number of non-zero data flag element in the bit mask and insert zero at the byte position of the mask flag elements that indicate the position of the zero data elements in the decompressed data. The decompression module may output the decomposed data in data chunks or packages according to the output bandwidth (e.g., 64 bytes). Because the decompressed data may be longer than the compressed input data by having zeros inserted, the decompression module may use two buffers to temporarily hold the decompressed data beyond the output bandwidth to be output in the next round. A counter register may be used to count the numbers of data elements in the output decompressed data. When the value in the counter register is greater than a first threshold (e.g., 63), the decompression module may use the first buffer to hold the extra data in the compressed data stream. When the value of the counter register is greater than a second threshold (e.g., 127), the decompression module may use both buffers to hold the extra data in the compressed data stream that are beyond the output bandwidth limit (e.g., 64 bytes).

In particular embodiments, a processor of a computing system may have an instruction set architecture (ISA) configured to compress uncompressed input data. The instruction set architecture may include a compression module configured to receive the uncompressed input data and to remove zero data elements from the uncompressed input data, and a counter register configured to count a number of non-zero data elements in the uncompressed input data. The ISA may include or be associated with one or more instructions configured to execute directly in hardware on the processor in machine code defined for the instruction set architecture. The one or more instructions may include a first instruction configured to set the compression module to (1) receive the uncompressed input data and (2) remove the zero data elements from the uncompressed input data. In particular embodiments, the decompression module may be further configured to generate a bit mask comprising an array of flag elements, and each flag element of the bit mask may indicate a non-zero data element or a zero data element in the uncompressed input data.

In particular embodiments, the array of flag elements may have an array length corresponding to a byte-length of the uncompressed input data. In particular embodiments, the decompression module may be further configured to generate zero removed data. The instruction set architecture may further include a shift register configured to receive the zero removed data from the decompression module. In particular embodiments, the shift register may be configured to combine at least a portion of the zero removed data with one or more portions of previous zero removed data into output compressed data in a pre-determined byte length corresponding to an output bandwidth of the instruction set architecture. In particular embodiments, the one or more instructions for the instruction set architecture may further have a second instruction configured to store the output compressed data to a memory.

In particular embodiments, the one or more portions of the previous zero removed data may be loaded from a buffer to the shift register. The shift register may be configured to write a remaining portion of the zero removed data back into the buffer. In particular embodiments, the instruction set architecture may be configured to compress the uncompressed input data autonomously during a compression process without involvements of software instructions. In particular embodiments, the counter register may be configured to hold a counter value that increments upon identifying a non-zero data element from the uncompressed input data. In particular embodiments, the uncompressed input data may be a portion of a continuous input data stream. The uncompressed input data may have a byte length corresponding to a bandwidth limit of an input data interface of the compression module.

In particular embodiments, a processor may include an instruction set architecture configured to decompress compressed input data. The instruction set architecture may include a decompression module configured to receive the compressed input data and bit mask data and to insert zero data elements into the compressed input data according to the bit mask data, and to count the number of non-zero data flag elements in the bit mask. A counter register may be configured to count the number of data elements in the output decompressed data to control the usage of two buffers for holding extra data beyond the output bandwidth limit. The instruction set architecture may include or be associated with one or more instructions configured to execute directly in hardware on the processor in machine code defined for the instruction set architecture. The one or more instructions may include a first instruction configured to set the decompression module to (1) receive the compressed input data and the bit mask data and (2) inset the zero data elements into the compressed input data according to the bit mask data.

In particular embodiments, the bit mask may include an array of flag elements, and each flag element of the bit mask data may indicate a non-zero data element or a zero data element in decompressed output data. In particular embodiments, the array of flag elements may have an array length corresponding to a byte-length of the compressed input data. In particular embodiments, the decompression module may be further configured to generate zero inserted data. The instruction set architecture may further include a first buffer and a second buffer. In particular embodiments, the decompression module may be further configured to output through a data output interface output uncompressed data, and the output uncompressed data may have a byte length corresponding to a bandwidth limit of the data output interface.

In particular embodiments, the decompression module may be further configured to write a remaining portion of the zero inserted data into the first buffer in response to a determination that the remaining portion of the zero inserted data is within a size limit of the first buffer. In particular embodiments, the decompression module may be further configured to write a remaining portion of the zero inserted data into the first buffer and the second buffer in response to a determination that the remaining portion of the zero inserted data is beyond a size limit of the first buffer. In particular embodiments, the one or more instructions for the instruction set architecture may further include a second instruction configured to store the output uncompressed data to a memory. In particular embodiments, the instruction set architecture may be configured to decompress the compressed input data autonomously during a decompression process without involvements of software instructions. In particular embodiments, the counter register may be configured to hold a counter value that increments upon each data element generated for the output decompressed data.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method of using an instruction set architecture to compress data including the particular steps of the method of FIG. 7, this disclosure contemplates any suitable method of using an instruction set architecture to compress data including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
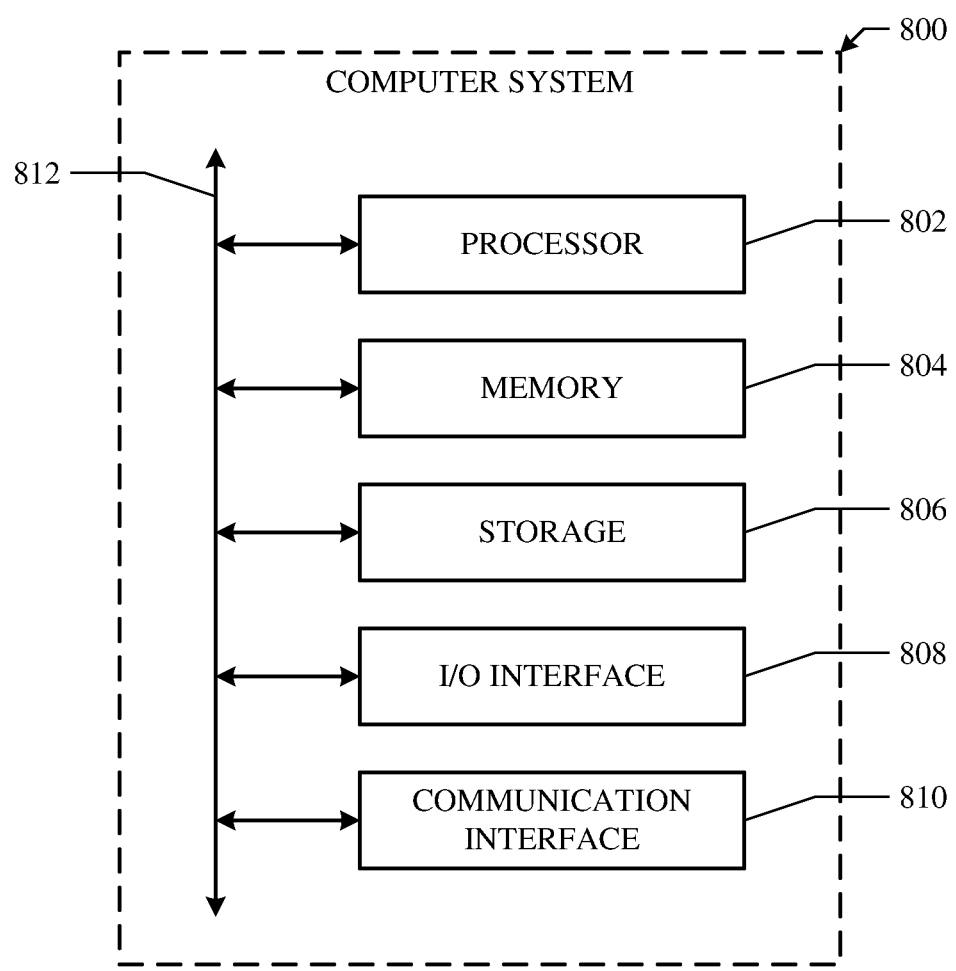
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A processor comprising:
an instruction set architecture configured to compress uncompressed input data, wherein the instruction set architecture comprises:
a compression module configured to autonomously and without involvement of software instructions:
read the uncompressed input data from a memory bank;
remove zero data elements from the uncompressed input data; and
write compressed output data to the memory bank;
a counter register configured to count a number of non-zero data elements in the uncompressed input data; and
one or more instructions configured to execute directly in hardware on the processor in machine code defined for the instruction set architecture, wherein the one or more instructions comprise a first instruction configured to set the compression module to (1) receive the uncompressed input data and (2) remove the zero data elements from the uncompressed input data.

2. The processor of claim 1, wherein the compression module is further configured to generate a bit mask comprising an array of flag elements, and wherein each flag element of the bit mask indicates a non-zero data element or a zero data element in the uncompressed input data.

3. The processor of claim 2, wherein the array of flag elements has an array length corresponding to a byte-length of the uncompressed input data.

4. The processor of claim 1, wherein the compression module is further configured to generate zero removed data, and wherein the instruction set architecture further comprises a shift register configured to receive the zero removed data from the compression module.

5. The processor of claim 4, wherein the shift register is configured to combine at least a portion of the zero removed data with one or more portions of previous zero removed data into output compressed data in a pre-determined byte length corresponding to an output bandwidth of the instruction set architecture.

6. The processor of claim 5, wherein the one or more portions of the previous zero removed data is loaded from a buffer to the shift register, and wherein the shift register is configured to write a remaining portion of the zero removed data back into the buffer.

7. The processor of claim 1, wherein the counter register is configured to hold a counter value that increments upon identifying a non-zero data element from the uncompressed input data.

8. The processor of claim 1, wherein the uncompressed input data is a portion of a continuous input data stream, and wherein the uncompressed input data has a byte length corresponding to a bandwidth limit of an input data interface of the compression module.

9. A processor comprising:
an instruction set architecture configured to decompress compressed input data, wherein the instruction set architecture comprises:
a decompression module configured to autonomously and without involvement of software instructions:
read the compressed input data and bit mask data from a memory bank;
insert zero data elements into the compressed input data according to the bit mask data; and
write uncompressed output data to the memory bank;
a counter register configured to count a number of data elements in decompressed output data; and
one or more instructions configured to execute directly in hardware on the processor in machine code defined for the instruction set architecture, wherein the one or more instructions comprise a first instruction configured to set the decompression module to (1) receive the compressed input data and the bit mask data and (2) insert the zero data elements into the compressed input data according to the bit mask data.

10. The processor of claim 9, wherein the bit mask comprises an array of flag elements, and wherein each flag element of the bit mask data indicates a non-zero data element or a zero data element in decompressed output data.

11. The processor of claim 10, wherein the array of flag elements has an array length corresponding to a byte-length of the compressed input data.

12. The processor of claim 9, wherein the decompression module is further configured to generate zero inserted data, and wherein the instruction set architecture further comprises a first buffer and a second buffer.

13. The processor of claim 12, wherein the decompression module is further configured to output through a data output interface output uncompressed data, and wherein the output uncompressed data has a byte length corresponding to a bandwidth limit of the data output interface.

14. The processor of claim 13, wherein the decompression module is further configured to write a remaining portion of the zero inserted data into the first buffer in response to a determination that the remaining portion of the zero inserted data is within a size limit of the first buffer.

15. The processor of claim 13, wherein the decompression module is further configured to write a remaining portion of the zero inserted data into the first buffer and the second buffer in response to a determination that the remaining portion of the zero inserted data is beyond a size limit of the first buffer.

16. The processor of claim 1, wherein the instruction set architecture is configured to compress the uncompressed input data autonomously during a compression process without involvement of software instructions.

17. The processor of claim 9, wherein the counter register is configured to hold a counter value that increments upon generating a data element in the uncompressed output data.

18. The processor of claim 1, wherein the compression module is configured to:
  read the uncompressed input data, remove zero data elements, and write compressed output data until all data bytes of the uncompressed input data are processed.

19. The processor of claim 1, wherein the processor is disposed within an augmented or virtual reality device.

* * * * *